(12) United States Patent
Kümmlee

(10) Patent No.: US 9,935,511 B2
(45) Date of Patent: Apr. 3, 2018

(54) COMPONENT FOR AN ELECTRIC MACHINE

(71) Applicant: SIEMENS AKTIENGESELLSCHAFT, München (DE)

(72) Inventor: Horst Kümmlee, Berlin (DE)

(73) Assignee: SIEMENS AKTIENGESELLSCHAFT, München (DE)

( * ) Notice: Subject to any disclaimer, the term of this patent is extended or adjusted under 35 U.S.C. 154(b) by 0 days.

(21) Appl. No.: 15/532,837

(22) PCT Filed: Nov. 20, 2015

(86) PCT No.: PCT/EP2015/077202
§ 371 (c)(1),
(2) Date: Jun. 2, 2017

(87) PCT Pub. No.: WO2016/087230
PCT Pub. Date: Jun. 9, 2016

(65) Prior Publication Data
US 2017/0366057 A1    Dec. 21, 2017

(30) Foreign Application Priority Data
Dec. 5, 2014 (EP) .................... 14196587

(51) Int. Cl.
*H02K 1/30* (2006.01)
*H02K 5/26* (2006.01)
(Continued)

(52) U.S. Cl.
CPC ............... *H02K 1/30* (2013.01); *H02K 1/185* (2013.01); *H02K 15/0006* (2013.01); *H02K 15/03* (2013.01)

(58) Field of Classification Search
CPC ................................... H02K 1/30; H02K 7/14
(Continued)

(56) References Cited

U.S. PATENT DOCUMENTS 3,112,420 A * 11/1963 Meyer ................... F03B 3/12
290/52
3,271,607 A 9/1966 Slotnick et al.
(Continued)

FOREIGN PATENT DOCUMENTS

DE    1183169 B * 12/1964 ............... H02K 1/30
EP    0175075 A1    3/1986
(Continued)

*Primary Examiner* — Jose Gonzalez Quinones
(74) *Attorney, Agent, or Firm* — Henry M. Feiereisen

(57) ABSTRACT

A component designed to form a rotor for an electric machine includes a shaft, and an active part which is disposed in concentric circumferentially surrounding relation to the shaft. The active part has a radially inwardly open slot. A leg is connected to the shaft and has a tip which points radially outward from the shaft and is received in the slot of the active part. Further received in the slot of the active part is a first end of a connecting element. A fastening element secures the connecting element in a region of a second end to the leg to thereby establish a form-fit connection of the leg and the connecting element to the active part.

32 Claims, 1 Drawing Sheet

(51) Int. Cl.
*H02K 1/18* (2006.01)
*H02K 15/03* (2006.01)
*H02K 15/00* (2006.01)

(58) Field of Classification Search
USPC .................................. 310/420, 421, 422, 426
See application file for complete search history.

(56) References Cited

U.S. PATENT DOCUMENTS

| | | | |
|---|---|---|---|
| 3,529,193 A * | 9/1970 | Ake | ........................ H02K 1/30 310/157 |
| 6,933,647 B2 | 8/2005 | Kümmlee et al. | |
| 9,233,373 B2 | 1/2016 | Kümmlee et al. | |
| 9,287,749 B2 | 3/2016 | Kümmlee | |
| 2006/0250037 A1 | 11/2006 | Kümmlee | |
| 2011/0266913 A1 | 11/2011 | Dawson | |
| 2011/0278994 A1 | 11/2011 | Kuwahara et al. | |

FOREIGN PATENT DOCUMENTS

| | | | | |
|---|---|---|---|---|
| EP | 0175075 B1 * | 10/1988 | ............. | H02K 1/185 |
| EP | 2387132 A2 | 11/2011 | | |
| JP | 2011239632 A | 11/2011 | | |

* cited by examiner

COMPONENT FOR AN ELECTRIC MACHINE

CROSS-REFERENCES TO RELATED APPLICATIONS

This application is the U.S. National Stage of International Application No. PCT/EP2015/077202, filed Nov. 20, 2015, which designated the United States and has been published as International Publication No. WO 2016/087230 A1 which claims the priority of European Patent Application, Serial No. 14196587.1, filed Dec. 5, 2014, pursuant to 35 U.S.C. 119(a)-(d).

BACKGROUND OF THE INVENTION

The invention relates to a component for an electric machine, wherein the component is designed as a rotor, comprising a shaft, an active part which surrounds the shaft in the circumferential direction and which is disposed concentrically to the shaft, and at least one leg which is connected to the shaft and the tip of which points radially outward from the shaft. The invention also relates to a component for an electric machine, wherein the component is designed as a stator, comprising a housing, a hollow cylindrical active part which is disposed inside the housing, and at least one leg which is connected to the housing and the tip of which points radially inward from the housing. The invention additionally relates to an electric machine comprising such a component. The invention further relates to a method for assembling such a component and/or such an electric machine and lastly to a servicing method for such a component and/or for such an electric machine.

Such components and/or methods are typically used for electric motors or generators. Modern optimized laminated cores, particularly of multi-pole machines, are of increasingly slim design, i.e. reduced in radial height. The required torque transmission between the laminated yoke and the spider shaft or the housing, as the case may be, can therefore no longer be achieved via conventional shrink joints, because the areas between the between the legs dip radially.

Complex/costly form-fit connections, such as e.g. tangential keyings, are often used as an alternative. These must be laboriously fitted and secured. They cannot be used over large lengths of several meters. Subsequent dismantling of the preloaded parts is often laborious if not quite impossible.

SUMMARY OF THE INVENTION

The object of the invention is to enable rotors or stators to be assembled inexpensively and reliably.

This object is achieved by a component of the type mentioned in the introduction which is designed as a rotor or stator, wherein the component has at least one respective connecting element and at least one respective fastening element, wherein the active part has a slot open radially outward or radially inward, as the case may be, for accommodating a respective first end of the respective connecting element and the respective tip of the respective leg, wherein the respective slot, the respective leg and the respective connecting element are designed such that a form-fit connection of the respective leg and of the respective connecting element to the active part can be obtained by fixation of the respective connecting element, in the region of the respective second end thereof, to the respective leg by means of the respective fastening element.

The object is also achieved by an electric machine comprising such a component.

The object is further achieved by a method for assembling such a component or such an electric machine, comprising the following steps:
  readying the shaft or housing and the respective leg connected to the shaft or housing,
  disposing the respective tip of the respective leg in the respective open slot of the active part,
  disposing the respective first end of the respective connecting element in the respective slot of the active part,
  connecting the respective leg and the respective connecting element to the active part in a form-fit manner by fixation of the respective connecting element, in the region of the respective second end thereof, to the respective leg by means of the respective fastening element.

The object is lastly achieved by a servicing method for such a component or for such an electric machine, comprising the following steps:
  releasing the form-fit connection of the respective leg and of the respective connecting element to the active part by releasing the fixation of the respective connecting element, in the region of the respective second end thereof, to the respective leg by means of the respective fastening element,
  exchanging and/or repairing at least one part of the active part,
  carrying out the method for assembling such a component using an active part which replaces the exchanged active part and/or using the repaired active part.

The proposed solution enables rotors or stators for electric machines to be produced reliably and in a cost-effective manner. For this purpose a respective leg is provided which, in the case of rotors, is connected to the shaft, and, in the case of stators, to the housing. A housing is understood quite generally as meaning a supporting structure to which the active part is connected in order to transmit the torques occurring during operation of the electric machine. The tip of the respective leg together with the respective connecting element is connected to the active part via a form-fit connection. This enables a reliable connection of the active part to the shaft or housing to be implemented for the rotor or stator, as the case may be.

The form-fit connection is achieved in that the active part has a respective slot which is open in the direction of the shaft or housing, as the case may be. The respective slot, the respective tip of the respective leg and the respective first end of the respective connecting element are designed such that the respective tip and the respective connecting element can be inserted in the respective slot. It is provided that the respective connecting element, in the region of the respective second end thereof, is fixed to the respective leg by means of the fastening element in order finally to obtain the form-fit connection of the respective leg and of the respective connecting element to the active part.

The proposed rotor or stator and the proposed methods therefore allow comparatively delicate yokes, the radial height of which is comparatively low. The form-fit connection also allows reliable transmission of variable torques.

A particular advantage of the proposed solution is that, in the case of a rotor, the yokes no longer need to be heated for shrinking onto the shaft. In the case of a stator, the advantage of the proposed solution is that the housing no longer needs to be heated for shrinking onto the active part. Particularly if the active part of the stator has a laminated core, this obviates the need for laborious welding of the housing, i.e. of a supporting structure having rear profiles, to the core stack.

In particular, this allows the use of thermally sensitive materials or components for the respective active part. Particularly in the case of rotors, thermally sensitive permanent magnet systems can be used.

Thus, for example, the complex/costly form-fit or keying systems currently used for roller drives can be replaced.

In an advantageous embodiment of the invention, the fixation of the respective connecting element to the respective leg by means of the respective fastening element can be designed as a mechanically detachable connection.

The mechanically detachable connection of the respective connecting element to the respective leg facilitates replacement or repair of at least part of the active part. Because due to a connection of this kind, in the case of an assembled component, the fixation can be released comparatively easily and conveniently, as a result of which the active part is particularly readily accessible and can if necessary be dismounted from the shaft or housing. In particular, the servicing method explained above is simplified by the mechanically detachable connection.

In another advantageous embodiment of the invention, the respective fastening element is implemented as a rivet or bolt, particularly for a compression fitting.

For example, the respective connecting element has a corresponding drilled through-hole for the respective fastening element, wherein the respective leg also preferably has a corresponding hole for receiving the respective fastening element. For example, the hole of the respective leg can be implemented as a blind hole or through-hole. If the respective fastening element is a bolt, particularly for a compression fitting, the hole of the respective leg preferably has a corresponding internal thread.

In another advantageous embodiment of the invention, the respective slot widens out at least in sections to its respective slot bottom in the circumferential direction.

For the component implemented as a rotor or stator, the respective slot bottom is located at the radially outer or inner end of the respective slot, as the case may be. The at least sectional widening-out of the respective slot is such that the width in the circumferential direction of the respective slot increases from the respective opening of the slot to the respective slot bottom at least in sections. From the respective slot bottom to the respective opening of the slot, the slot is therefore wedge-shaped at least in sections.

This design of the respective slot permits secure and reliable connection of the respective leg, of the respective connecting element and of the active part. This is achieved, for example, in that a respective leg and a respective connecting element which together have an increasing width in the circumferential direction toward the respective second end are or have been inserted into the explained, at least sectionally wedge-shaped respective slot. A form-fit connection of the respective leg and of the respective connecting element to the active part is therefore achieved.

In another advantageous embodiment of the invention, said slot is dovetail-shaped at least in sections.

The respective leg and the respective connecting element are accordingly designed such that they together engage in the respective dovetail-shaped slot so that a particularly reliable connection of the respective leg, of the respective connecting element and of the active part can be obtained.

In another advantageous embodiment of the invention, the respective leg widens out toward the tip thereof in the circumferential direction at least in the region of the lateral surface which is assigned to a first lateral surface of the respective slot.

In the assembled state, said lateral surface of the respective leg is in contact, at least in sections, with the first lateral surface of the respective slot. The respective leg preferably widens out at least at said lateral surface correspondingly to the design of the respective slot so that, in the assembled state, the respective leg is in contact with the first lateral surface over a large surface area. The respective leg is advantageously designed such that, in the assembled state, it is in contact with the respective slot bottom, wherein it preferably bears on the slot bottom over a large surface area. In particular, the respective leg can therefore be made essentially dovetail-shaped at least in the region of said lateral surface.

In another advantageous embodiment of the invention, the respective connecting element widens out, at least in the region of the lateral surface which is assigned to a second lateral surface of the respective slot, toward its respective first end in the circumferential direction.

In the assembled state, said lateral surface of the respective connecting element is in contact, at least in sections, with the second lateral surface of the respective slot. The respective connecting element preferably widens out at least at said lateral surface correspondingly to the design of the respective slot, so that, in the assembled state, the respective connecting element is in contact with the second lateral surface over a large surface area. The respective connecting element is advantageously designed such that, in the assembled state, it is in contact with the respective slot bottom, wherein it preferably bears on the slot bottom over a large surface area. In particular, the respective connecting element can therefore be essentially dovetail-shaped at least in the region of said lateral surface.

In another advantageous embodiment of the invention, the respective connecting element has, between both ends thereof, on its side facing the respective leg, a pivot point, in particular a projection, which, in the assembled state of the respective connecting element, bears on the respective leg, wherein the respective connecting element has a shorter first lever arm and a longer second lever arm, wherein the first lever arm is the effective length between the pivot point and at least one first contact point at which the respective connecting element bears on the active part in the slot, wherein the second lever arm is the effective length between the pivot point and at least one second contact point at which the respective connecting element, in the region of the respective second end thereof, is fixed to the respective leg by means of the respective fastening element.

If the respective connecting element has a projection, this acts as a pivot point. Alternatively, it is also conceivable for the respective connecting element to have no separate projection and the respective leg to have a corresponding elevation via which the respective connecting element can rotate about the pivot point. Said pivot point subdivides the respective connecting element into a shorter first lever arm and a longer second lever arm. The first contact point which together with the position of the pivot point determines the first lever arm is a point on the respective connecting element at which the respective connecting element bears on the slot bottom or on the second side of the respective slot.

Such a design of the respective connecting element permits the required preload forces for reliable connection of the respective leg and of the respective connecting element to the active part to be achieved according to the toggle lever principle using comparatively simple and small fastening elements. Therefore, even a comparatively small preload force for the respective fastening element can suffice in order to nevertheless achieve a sufficiently large preload force for said connection. In particular, the toggle lever principle can therefore be used to return the required preload forces to relatively small bolted connections.

In particular, this makes it possible to achieve relatively delicate yokes for electric machines, wherein variable torques can nevertheless also be reliably transmitted.

By appropriate selection of the lever ratios, virtually any preload forces can be applied. The ratio of the length of the second lever arm to the length of the first lever arm is preferably at least 2:1, preferably at least 3:1 or more.

In another advantageous embodiment of the invention, the ratio of the length of the second lever arm to the length of the first lever arm is at least 5:1 or 10:1.

In particular, in the case of larger machines having a rotor diameter or stator internal diameter of at least 500 mm, such a ratio of the respective length of the two lever arms provides a secure connection of the respective leg and of the respective connecting element to the active part. However, at the same time a comparatively simple respective fastening element can be used and/or a comparatively small preload force taken into account.

In another advantageous embodiment of the invention, the component is designed such that the respective leg can be centered, in particular in a play-free manner, with respect to the active part in the radial direction and/or in the circumferential direction.

Such a design of the component, in particular of the respective connecting element, enables particularly reliable assembly of the rotor or stator and, in particular, a particularly loadable connection of the respective leg and of the respective connecting element to active part to be achieved. For example, the respective slot bottom can also be designed such that radial centering of the respective leg and if necessary of the respective connecting element with respect to the active part can be achieved.

In particular, such a component is particularly immune to variable torques and vibrations. This enables relatively delicate yokes of electric machines to be centered in a play-free manner and also variable torques to be transmitted tangentially in a play-free manner.

In another advantageous embodiment of the invention, at least one adjusting element is disposed between the respective leg and the respective connecting element in the region of the second contact point at which the respective connecting element, in the region of the respective second end thereof, is fixed to the respective leg by means of the respective fastening element.

The respective adjusting element can be implemented as a shim, for example. An adjustment can therefore be achieved via the thickness or the number of respective adjusting elements. The at least one adjusting element can be used in particular for tolerance compensation.

For example, the active part is fitted with permanent magnets and/or of laminated design.

The proposed components or electric machines can preferably be operated with an electric power of at least 1 MW, in particular of at least 10 MW. The rotor diameter or stator internal diameter is preferably at least 500 mm, in particular at least 2000 mm. The proposed component and/or electric machine is preferably used in a POD drive for marine propulsion.

BRIEF DESCRIPTION OF THE DRAWINGS

The invention will now be described and explained in greater detail with reference to the exemplary embodiments illustrated in the accompanying drawings, in which.

DETAILED DESCRIPTION OF THE EMBODIMENTS

Figure 1:
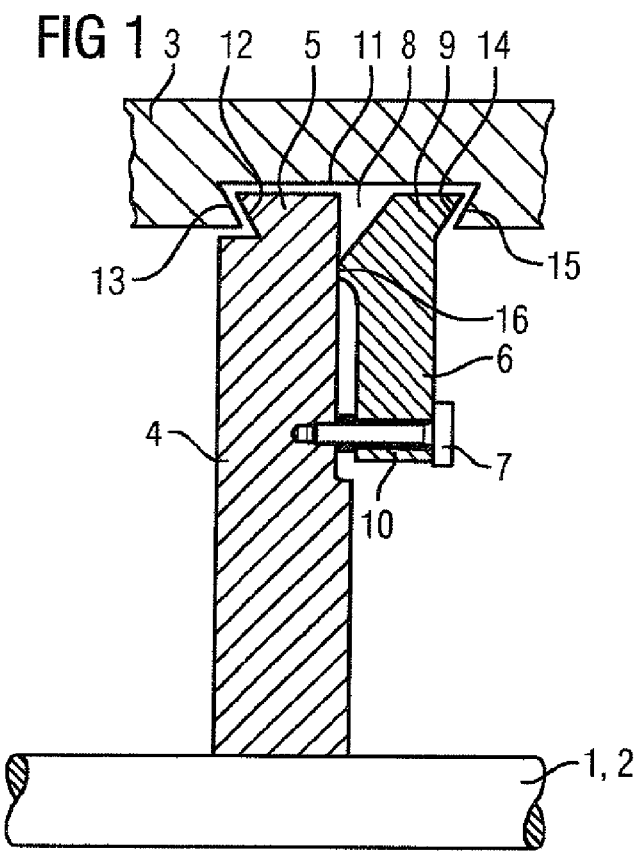
FIG. 1 shows a first exemplary embodiment of the component according to the invention.

FIG. 1 shows a first exemplary embodiment of the component according to the invention, wherein only a detail is illustrated. The proposed component can be designed as a rotor or as a stator.

In the embodiment of the component as a rotor it is provided that the component has a shaft 1, an active part 3 which surrounds the shaft 1 in the circumferential direction and which is disposed concentrically to the shaft 1, and a leg 4 which is connected to the shaft 1 and the tip 5 of which points radially outward from the shaft 1. If the component is designed as a stator, it is provided that the component has a housing 2, a hollow cylindrical active part 3 which is disposed inside the housing 2, and a leg 4 which is connected to the housing 2 and the tip 5 of which points radially inward from the housing 2.

The component additionally has a connecting element 6 and a fastening element 7, wherein the active part 3 has an open slot 8 for accommodating a first end 9 of the connecting element 6 and the tip 5 of the leg 4. In the embodiment as a rotor or stator, the slot 8 is open radially inward or radially outward, as the case may be. The slot 8, the leg 4 and the connecting element 6 are designed such that a form-fit connection of the leg 4 and of the connecting element 6 to the active part 3 can be obtained by fixation of the connecting element 6, in the region of the second end 10 thereof, to the leg 4 by means of the fastening element 7.

The fixation of the connecting element 6 to the leg 4 by means of the fastening element 7 is designed as a mechanically detachable connection. In particular, a fastening element 7 in the form of a rivet or a bolt, in particular for a compression fitting, can be used.

The slot 8 advantageously widens out in the circumferential direction toward the respective slot bottom 11, as indicated in FIG. 1. In particular, the respective slot 8 can be dovetail-shaped at least in sections. For example, the leg 4 widens out in the circumferential direction in the region of the lateral surface 12 which is assigned to a first lateral surface 13 of the slot 8, wherein, alternatively or additionally, the connecting element 6 widens out in the circumferential direction in the region of the lateral surface 14 which is assigned to a second lateral surface 15 of the slot 8.

The connecting element 6 has, between the two ends 9, 10 thereof, on its side facing the leg 4, a pivot point 16 which can be implemented as a projection, e.g. as indicated in FIG. 1. Alternatively, it is also conceivable for the connecting element 6 to have no separate projection and the leg 4 to have a corresponding elevation via which the connecting element 6 is rotatable about the pivot point 16. Further aspects of the pivot point 16 will be explained in more detail in connection with the second exemplary embodiment.

Figure 2:
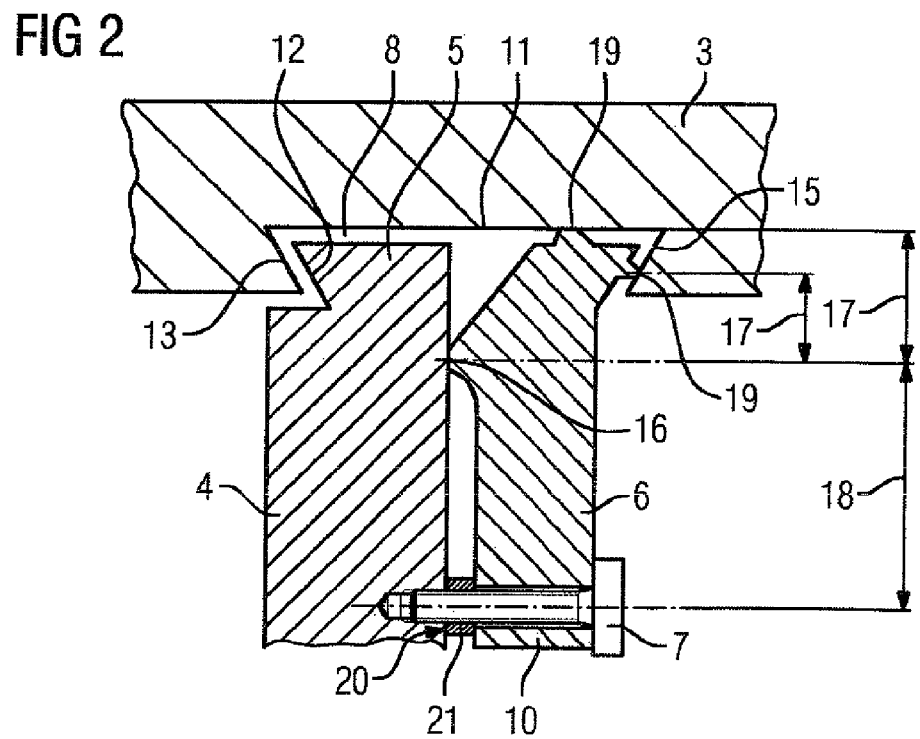
FIG. 2 shows a second exemplary embodiment of the component according to the invention.

FIG. 2 shows a detail of a second exemplary embodiment of the component according to the invention. Identical items are denoted by the same reference characters as in FIG. 1.

In the slot 8, the connecting element 6 bears on the active part 3 at a first contact point 19, wherein, as indicated in FIG. 2, two first contact points 19 can also be present. Thus, one of the first contact points 19 can be disposed on the slot bottom 11 and a second of the first contact points 19 on the second lateral surface 15 of the slot 8. Such a design of the first contact point 19 enables particularly good centering, in particular both in the radial direction and in the circumferential direction, to be achieved which can be implemented in a play-free manner, for example. Accordingly to the two first contact points 19, a first lever arm 17 corresponding to the effective length between the pivot point 16 and the respective first contact point 19 can be shorter or longer, depending on which of the first two contact points 19 is relevant.

The connecting element 6 also has a second lever arm 18 which is longer than the first lever arm 17, wherein the second lever arm 18 corresponds to the effective length between the pivot point 16 and a second contact point 20. In the case of the second contact point 20, the connecting element 6, in the region of the far end 10 thereof, is fixed to the leg 4 by means of the fastening element 7.

In particular, the ratio of the length of the second lever arm 18 to the length of the first lever arm 17 can be at least 2:1 or 3:1. However, this ratio can advantageously be at least 5:1 or 10:1.

In addition, an adjusting element 21 is provided which is disposed between the connecting element 6 and the leg 4 in the region of the second contact point 20 at which the connecting element 6, in the region of the second end 10 thereof, is fixed to the leg 4 by means of the fastening element 7. Particularly reliable centering, in particular play-free centering, can be achieved by means of the adjusting element 21.

As already explained in connection with the first exemplary embodiment, the connecting element 6 can have a pivot point 16 implemented as a projection. Alternatively, it is also conceivable for the connecting element 6 to have no separate projection and the leg 4 to have a corresponding elevation via which the connecting element 6 is rotatable about the pivot point 16.

To summarize, the invention relates to a component for an electric machine, wherein the component is designed as a rotor, comprising a shaft, an active part which surrounds the shaft in the circumferential direction and which is disposed concentrically with respect to the shaft, and at least one leg which is connected to the shaft and the tip of which points radially outward from the shaft. The invention also relates to a component for an electric machine, wherein the component is designed as a stator, comprising a housing, a hollow cylindrical active part which is disposed inside the housing, and at least one leg which is connected to the housing and the tip of which points radially inward from the housing. In addition, the invention relates to an electric machine comprising such a component. The invention further relates to a method for assembling such a component or of such an electric machine and lastly to a servicing method for such a component or electric machine.

In order to enable rotors or stators to be assembled inexpensively and reliably, it is proposed that the component has at least one respective connecting element and at least one respective fastening element, wherein the active part has a radially inward or radially outward open slot, as the case may be, for accommodating a respective first end of the respective connecting element and the respective tip of the respective leg, wherein the respective slot, the respective leg and the respective connecting element are designed such that, by fixation of the respective connecting element in the region of the respective second end thereof to the respective leg by means of the respective fastening element, a form-fit connection of the respective leg and of the respective connecting element to the active part can be obtained. Also proposed is an electric machine comprising such a component.

A method for assembling such a component or such an electric machine is proposed, comprising the following steps:
- readying the shaft or housing and the respective leg connected to the shaft or housing,
- disposing the respective tip of the respective leg in the respective open slot of the active part,
- disposing the respective first end of the respective connecting element in the respective slot of the active part,
- connecting the respective leg and the respective connecting element to the active part in a form-fit manner by fixation of the respective connecting element in the region of the respective second end thereof to the respective leg by means of the respective fastening element.

Lastly, a servicing method for such a component or for such an electric machine is proposed, comprising the following steps:
- releasing the form-fit connection of the respective leg and of the respective connecting element to the active part by releasing the fixation of the respective connecting element in the region of the respective second end thereof to the respective leg by means of the respective fastening element,
- replacing and/or repairing at least one part of the active part,
- carrying out the method for assembling such a component using an active part which replaces the exchanged active part and/or using the repaired active part.

What is claimed is:

1. A component forming a rotor for an electric machine, comprising:
   a shaft;
   an active part disposed in concentric circumferentially surrounding relation to the shaft, said active part having a radially inwardly open slot;
   a leg connected to the shaft and having a tip which points radially outward from the shaft and is received in the slot of the active part;
   a connecting element having a first end and received in the slot of the active part, and a second end; and
   a fastening element configured to fix the connecting element in a region of the second end to the leg to thereby establish a form-fit connection of the leg and the connecting element to the active part.

2. The component of claim 1, wherein the fastening element is configured to effect a mechanically detachable connection.

3. The component of claim 2, wherein the fastening element is configured as a rivet or a bolt.

4. The component of claim 3, wherein the fastening element is configured for effecting a compression fitting.

5. The component of claim 1, wherein the slot has at least one section which widens out towards a bottom of the slot in a circumferential direction.

6. The component of claim 5, wherein the at least one section has a dovetail-shaped configuration.

7. The component of claim 5, wherein the leg widens out in the circumferential direction toward the tip at least in a region of a lateral surface assigned to a first lateral surface of the slot.

8. The component of claim 5, wherein the connecting element widens out in the circumferential direction toward the first end at least in a region of a lateral surface assigned to a second lateral surface of the slot.

9. The component of claim 1, wherein the connecting element has a pivot point between the first and second ends thereof on a side facing the leg, said pivot point bearing on the leg in an assembled state of the connecting element, said connecting element including a first lever arm of a length which is shorter than a length of second lever arm of the connecting element, said first lever arm constituting an effective length between the pivot point and a first contact point at which the connecting element bears on the active part in the slot, said second lever arm constituting an effective length between the pivot point and a second contact point at which the connecting element is fixed to the leg by the fastening element.

10. The component of claim 9, wherein the pivot point is a projection.

11. The component of claim 9, wherein a ratio of the length of the second lever arm to the length of the first lever arm is at least 5:1 or 10:1.

12. The component of claim 1, wherein the leg is configured to enable centering thereof radially and/or circumferentially with respect to the active part.

13. The component of claim 12, wherein the leg is centered in a play-free manner with respect to the active part.

14. The component of claim 9, further comprising an adjusting element disposed between the leg and the connecting element in a region of the second contact point.

15. A component forming a stator for an electric machine, comprising:
a housing;
a hollow cylindrical active part disposed inside the housing and having a radially outwardly open slot;
a leg connected to the housing and having a tip which points radially inward from the housing and is received in the slot of the active part;
a connecting element having a first end received in the slot of the active part, and a second end; and
a fastening element configured to fix the connecting element in a region of the second end to the leg to thereby establish a form-fit connection of the leg and the connecting element to the active part.

16. The component of claim 15, wherein the fastening element is configured to effect a mechanically detachable connection.

17. The component of claim 16, wherein the fastening element is configured as a rivet or a bolt.

18. The component of claim 17, wherein the fastening element is configured for effecting a compression fitting.

19. The component of claim 15, wherein the slot has at least one section which widens out towards a bottom of the slot in a circumferential direction.

20. The component of claim 19, wherein the at least one section has a dovetail-shaped configuration.

21. The component of claim 19, wherein the leg widens out in the circumferential direction toward the tip at least in a region of a lateral surface assigned to a first lateral surface of the slot.

22. The component of claim 19, wherein the connecting element widens out in the circumferential direction toward the first end at least in a region of a lateral surface assigned to a second lateral surface of the slot.

23. The component of claim 15, wherein the connecting element has a pivot point between the first and second ends thereof on a side facing the leg, said pivot point bearing on the leg in an assembled state of the connecting element, said connecting element including a first lever arm of a length which is shorter than a length of second lever arm of the connecting element, said first lever arm constituting an effective length between the pivot point and a first contact point at which the connecting element bears on the active part in the slot, said second lever arm constituting an effective length between the pivot point and a second contact point at which the connecting element is fixed to the leg by the fastening element.

24. The component of claim 23, wherein the pivot point is a projection.

25. The component of claim 23, wherein a ratio of the length of the second lever arm to the length of the first lever arm is at least 5:1 or 10:1.

26. The component of claim 15, wherein the leg is configured to enable centering thereof radially and/or circumferentially with respect to the active part.

27. The component of claim 26, wherein the leg is centered in a play-free manner with respect to the active part.

28. The component of claim 23, further comprising an adjusting element disposed between the leg and the connecting element in a region of the second contact point.

29. An electric machine, comprising a component to form a rotor, said component comprising a shaft, an active part disposed in concentric circumferentially surrounding relation to the shaft, said active part having a radially inwardly open slot, at least one leg connected to the shaft and having a tip which points radially outward from the shaft and is received in the slot of the active part, a connecting element having a first end and received in the slot of the active part, and a second end, and a fastening element configured to fix the connecting element in a region of the second end to the leg to thereby establish a form-fit connection of the leg and the connecting element to the active part.

30. An electric machine, comprising a component to form a stator, said component comprising a housing, a hollow cylindrical active part disposed inside the housing and having a radially outwardly open slot, a leg connected to the housing and having a tip which points radially inward from the housing and is received in the slot of the active part, a connecting element having a first end received in the slot of the active part, and a second end, and a fastening element configured to fix the connecting element in a region of the second end to the leg to thereby establish a form-fit connection of the leg and the connecting element to the active part.

31. A method for assembling a component for use in an electric machine, said method comprising:
connecting a leg to a shaft or a housing;
disposing a tip of the leg in an open slot of an active part;
disposing a first end of a connecting element in the slot of the active part; and
fixing the leg and the connecting element to the active part by a form-fit connection in a region of a second end of the connecting element via a fastening element.

32. A servicing method for a component for use in an electric machine, said servicing method comprising:
releasing a form-fit connection of a leg and a connecting element to an active part by loosening a fastening element to release a fixation of the connecting element in a region of an end thereof to the leg;
exchanging the active part with another active part or repairing at least one part of the active part;
connecting the leg to a shaft or a housing;
disposing a tip of the leg in an open slot of the other or repaired active part;
disposing a first end of the connecting element in the slot of the other or repaired active part; and fixing the leg and the connecting element to the other or repaired active part by a form-fit connection in the region of the end of the connecting element via the fastening element.

* * * * *